United States Patent [19]
Uhing et al.

[11] 3,879,500
[45] Apr. 22, 1975

[54] PROCESS FOR PREPARING MONO- AND DI-ALKYLMERCAPTOPHOSPHOROTH-IONOCHLORIDATES

[75] Inventors: Eugene H. Uhing, Ridgewood, N.J.; Arthur D. F. Toy, Stamford, Conn.

[73] Assignee: Stauffer Chemical Company, Westport, Conn.

[22] Filed: Oct. 15, 1973

[21] Appl. No.: 406,746

[52] U.S. Cl. ................ 260/981; 260/960; 260/986
[51] Int. Cl. ............................................. C07f 9/20
[58] Field of Search ........................... 260/981, 986

[56] References Cited
UNITED STATES PATENTS
2,405,482   8/1946   Zimmer et al. ................. 260/981 X
2,836,534   5/1958   Birum ............................ 260/981 X Primary Examiner—Lorraine A. Weinberger
Assistant Examiner—Richard L. Raymond

[57] ABSTRACT

This invention provides a process for the preparation of mono- and di-alkylmercapto phosphorothionochloridates. In this reaction an alkyl chloride and phosphorus pentasulfide are reacted at an effective temperature in the range of from about 160° to about 300° C. depending upon the particular alkyl halide employed. As an embodiment of this invention a method is set forth for the production of mono-alkylmercapto phosphorothionodichloridate.

28 Claims, No Drawings

PROCESS FOR PREPARING MONO- AND DI-ALKYLMERCAPTOPHOSPHOROTHIONO-CHLORIDATES

This invention relates to a process for the manufacture of mono- and di-alkylmercapto phosphorothionochloridates.

The alkylmercapto phosphorothionochloridates find particular utility as intermediates for compounds which exhibit biocidal properties, particularly insecticidal and herbicidal properties.

In the past, a number of processes have been proposed to prepare compounds similar to those prepared by the processes of this invention. For example:

(1)    P(S)Cl$_3$ + RSH → (RS)P(S)Cl$_2$ (2)    RSPCl$_2$ + S → RS-P(S)Cl$_2$ (3) 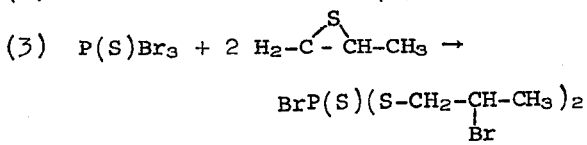

These prior art processes are described in detail in *Methoden Der Organishen Chemie* Band XII/1, Teil 1 pages 682–683 and 739–740 (1963) published by Georg Thieme Verlug, Stuttgart, Germany. These processes have been found to some extent to be deficient in that the product is limited to the dichloride or the monochloride, the yields are too low or the trialkyl mercapto analog is formed.

The present process is believed to provide greater control over product formation and improved yields.

In accordance with the present invention, it has been found that the mono- and di-alkylmercapto phosphorothionochloridates are prepared by the reaction of a corresponding alkylchloride and phosphorus pentasulfide (P$_4$S$_{10}$).

This reaction can be represented by the following equation 1:

6 R—Cl + P$_4$S$_{10}$ → 2RSP(S)Cl$_2$ + 2(RS)$_2$P(S)Cl (1)

In the equation above, R is lower alkyl, aralkyl or cyclohexyl. By the term lower alkyl it is intended to include both n-alkyl and secondary alkyl. Preferably the lower alkyl group contains from 1–8 carbon atoms inclusive and preferably from 1–4 carbon atoms. Representative of rare methyl, ethyl, n-propyl, isopropyl, n-butyl, cyclohexyl and benzyl.

The reactants employed in the process of this invention can be employed in stoichiometric amounts, although excess of either reactant can be used if desired. It is generally preferred to employ the alkyl chloride in excess.

The temperature at which the reactions of this invention are conducted are between about 160° and 300°C. depending upon the particular alkyl chloride employed. The specific reaction temperature employed depends to a certain extent on the reactants employed and the time in which the reaction is to be run. However, the reaction temperature is critical and should generally be maintained within the range of 200° to 300°C. Certain alkyl chlorides such as isopropyl chloride will react below 200°C. The lower range can be easily determined by those skilled in the art. Above about 300°C. the reaction products begin to degrade. This limit is also easily determined by those skilled in the art.

The reaction of this invention can be run at atmospheric or super-atmospheric pressures. The choice of pressure is determined primarily by the reactants. When high boiling chlorinated alkyls are reacted, atmospheric pressure can be employed. When low boiling materials are used, it is necessary to employ super-atmospheric pressure. For ease of reaction control it is preferred to employ autogenous pressure. Autogenous pressures as high as about 3000 psig can occur during the reaction.

As can be seen from reaction 1 above, both the mono- and di- chloride product is formed. It is an embodiment of this invention to direct the product almost in its entirety to the dichloride derivative through the incorporation of thiophosphorus trichloride in the reaction mixture in accordance with the reaction Mechanism 2 as set forth below:

6 R Cl + P$_4$S$_{10}$ + 2PSCl$_3$ → 6RSP(S)Cl$_2$ (2)

Alternatively, the conversion to the dichloride can be accomplished after the product has been formed according to reaction (1) by reacting the monochloride product with PSCl$_3$. The PSCl$_3$ can be reacted with the separated monochloride product or can be added to the reaction mixture. The reaction proceeds according to reaction mechanism (3) set forth below:

(RS)$_2$ P(S)Cl + PSCl$_3$ → 2RSP(S)Cl$_2$ (3)

It has been found that the alkylchloride which produces the best yields is CH$_3$Cl. As the R group becomes more complex, more side reactions are possible and appear to occur. The side reactions lower the yield of the products shown in equation 1.

The examples set forth below serve to illustrate and exemplify the present invention. In these examples and throughout the specification, all parts and percentages are by weight. The term "glc" where used stands for "gas liquid chromatography."

EXAMPLE 1

Reaction with Methyl Chloride

In a 300 ml. stainless steel autoclave was placed 66 grams of P$_4$S$_{10}$ (molecular weight 444; 0.15 mole). To this was added 45 grams of methyl chloride (molecular weight 50.01; 0.9 mole). The autoclave was heated at 200°C. for 4½ hours and at 215°C. for 2 hours. The pressure dropped sharply after 2½ hours of heating. A pour out yield of 109 grams was obtained. Analysis of the reaction mixture by gas liquid chromatography showed the following composition:

| Component | Area % |
|---|---|
| PCl$_3$ | 2.6 |
| PSCl$_3$ | 2.2 |
| CH$_3$SP(S)Cl$_2$ | 43.1 |
| (CH$_3$S)$_2$P(S)Cl | 45.1 |
| (CH$_3$S)$_3$PS | 4.8 |

EXAMPLES 2-7

Reaction with Methyl Chloride

The reaction of Example 1 was repeated varying the temperature and the time of reaction with the results set forth in Table 1 below:

TABLE 1

| Example | Temp.°C. | Time(hrs.) | $PCl_3$ | $PSCl_3$ | Gas Chromatograph Assay of Crude Product % I | II | III |
|---|---|---|---|---|---|---|---|
| 2 | 190 | 13 | | | No Significant Reaction | | |
| 3 | 200 | 12 | 4.7 | 1.2 | 45.1 | 46.4 | 2.6 |
| 4 | 225-230 | 3 | 2.3 | 1.9 | 36.4 | 40.1 | 6.3 |
| 5 | 260 | 2.5 | | | 35.5 | 44.0 | 5.3 |
| 6 | 270 | 1.5 | | | 31.9 | 40.1 | |
| 7 | 300 | 0.166 | | | 22 | 9.8 | 8.4 |

Product I = $CH_3SP(S)Cl_2$
Product II = $(CH_3S)_2P(S)Cl$
Product III = $(CH_3S)_3PS$ As the reaction temperature increases it will be noted that the yield of desired products tend to be lower. The decrease in yield is believed to be due to the reaction of methyl chloride with product already formed to form methyl thioether. It is also believed that the products have relatively low thermal stability and form byproducts such as methylphosphonothioic dichloride $(CH_3P(S)Cl_2)$ and dimethylphosphinothioic chloride $[(CH_3)_2P(S)Cl]$. In addition to the loss in yield represented by their formation, the byproducts can subsequently enter into exchange reactions with the primary products thereby further decreasing the yield.

It was also noted during the experiments set forth as Examples 2-7 that at the lowest reaction temperature of 200°C. there was an induction period of several hours before any reaction occurred as indicated by the sharp pressure drop which occurs when the gaseous methyl chloride reacts with the solid phosphorus pentasulfide.

Purification of the products set forth in Table 1 recover a purified yield of about 90 percent of the products in the crude mixture. Analysis of the preferred products (I and II) obtained through the reaction of methyl chloride and phosphorus pentasulfide at a temperature of 200° to 215°C. is shown below.

Heating was done by placing the autoclave in an electrically heated jacket and an external thermocouple controlled the reaction temperature. The time required for reaction to reach the desired temperature was 60–70 minutes. The autoclave was rocked in order to provide agitation.

EXAMPLE 8

Reaction with Ethyl Chloride

The 300 ml. stainless steel autoclave was charged with 58 grams of ethyl chloride (0.9 mole) and 67 grams of phosphorus pentasulfide (0.15 mole). The reaction mixture was heated to a temperature of 200°C. and maintained at this temperature for 13½ hours. After the reaction period the reaction mixture was cooled and the product of the reaction recovered. The recovered product contained 51 grams of unreacted ethyl chloride and 3 grams of a liquid product. The results indicated that the reaction temperature was not high enough.

EXAMPLE 9

Example 8 was repeated except the reaction was conducted at a temperature of 230°C. for 13½ hours. After cooling, 8 grams of unreacted ethyl chloride was vented from the autoclave, 110 grams of a black viscous liquid product was recovered. Analysis by gas chromatography showed the crude product to contain 21 percent of Product IV and 42 percent of Product V. Five byproducts were present in the 5–10 percent range.

| Compound | Found P | S | Cl | Calcld. P | S | Cl | Found $n_D^{25}$ |
|---|---|---|---|---|---|---|---|
| $CH_3SP(S)Cl_2$ | 17.05 | 35.7 | 39.4 | 17.1 | 35.4 | 39.2 | 1.6126 |
| $(CH_3S)_2P(S)Cl$ | 15.80 | 50.4 | 19.3 | 16.1 | 50.0 | 18.5 | 1.6470 |

The H-nmr spectra confirms the structures as shown. Furthermore, the presence of $(CH_3S)_3PS$ was confirmed by H-nmr spectra identical to that reported in the literature. Boiling points were determined for the two products as follows:

Product I — $CH_3SP(S)Cl_2 = 25°-30°C.$ at 0.1 mm Hg
Product II — $(CH_3S)_2P(S)Cl = 75°-78°C.$ at 0.1 mm Hg In Examples 1–7 above the reaction was conducted at autogenous pressure in a 300 ml. stainless steel autoclave rated for 5,000 lbs. per square inch pressure.

The crude product was distilled at a temperature of 70°–160°C. at 760–0.05mm Hg. pressure to yield 63.5 grams of distilled product. This material was redistilled to give 15 grams of Product IV having a boiling point of 30°C. at 0.05 mm Hg. and $n_D^{25}$ of 1.5893.

Product IV = $C_2H_5SP(S)Cl_2$
Analysis — Found: P, 15.5; S, 32.4; Cl, 36.9.
Calcd: P, 15.9; S, 32.8; Cl, 36.4.

16 grams of Product V which had a boiling point of 92°C. at 0.01 mm Hg. an $n_D^{25}$ of 1.6096 were also recovered.

Product V = $(C_2H_5S)_2P(S)Cl$
Analysis — Found: P, 14.7; S, 43.4; Cl, 17.3.
Calcd: P, 14.1; S, 43.7; Cl, 16.1.

EXAMPLE 10

Reaction with 2-Chloropropane 70 grams of 2-chloropropane (0.9 mole) and 66.6 grams of $P_4S_{10}$ (0.15 mole) were charged to the 300 ml. stainless steel autoclave of Example 1. The autoclave was heated to a temperature of 200°C. for a period of 15 hours. After cooling the vent gas was analyzed and found to contain 0.2 mole HCl. There remained 120 grams of a dark liquid. Gas chromatograph analysis of the dark liquid indicated 10 different products were present. It was concluded that the reaction temperature was too high or the reaction time too long.

EXAMPLE 11

Example 10 was repeated except that the reaction mixture was maintained at 160°C. for 18 hours. The reaction mixture was found to contain 43 grams of unreacted 2-chloropropane. It was concluded that the temperature was too low or the reaction time too short. Example 10 was repeated except that the temperature was maintained at 190°C. for a period of 19 hours. Gas chromatograph analysis indicated the reaction mixture contained 6.7 percent unreacted 2-chloropropane; 13 percent isopropylmercapto phosphorothionodichloridate; 18 percent diisopropylmercapto phosphorothionochloridate and 7 other products present in the 5-20 percent range.

EXAMPLE 12

Example 10 was repeated except that 70 grams (0.9 mole) of 2-chloropropane was reacted with 66.6 grams (0.15 mole) of $P_4S_{10}$ at a temperature of 170°C. for a period of 58 hours. After cooling, 79 grams of a liquid-solid product mixture was obtained from the autoclave. After filtering to remove the solids, the yield of liquid was 62 grams. Gas chromatographic analysis of the liquid showed it contained 20 percent 2-chloropropane; 13 percent isopropylmercapto phosphorothionodichloridate; 18 percent di-isopropylmercapto phosphorothionochloridate and 23 percent high boiling point material. The crude product was distilled to yield 8 grams of isopropylmercapto phosphorothionodichloridate which had a boiling point of 34°C. at 0.1 mm Hg. and $n_D^{25}$ = 1.5682.

Analysis for $C_3H_7S\ P(S)Cl_2$ —
Found: P, 14.5; S, 30.1; Cl, 34.2.
Calcd: P, 14.6; S, 30.5; Cl, 34.0.

11 grams of di-isopropylmercapto phosphorothionochloridate was also recovered from the crude product. This material had a boiling point of 67°C. at 0.1 mm Hg. and $n_D^{25}$ of 1.5774.

Analysis for $(C_3H_7S)_2P(S)Cl$—
Found: P, 12.6; S, 38.7; Cl, 15.1.
Calcd: P, 12.5; S, 38.7; Cl, 14.3.

EXAMPLE 13

Reaction with 1-Chloropropane 70 grams of 1-chloropropane (0.9 mole) and 66.6 grams of $P_4S_{10}$ (0.15 mole) were charged to the 300 milliliter stainless steel autoclave used in Example 1. The mixture was heated at a temperature of 200°C. for a period of 19 hours. No pressure drop was observed. The reaction mixture was then heated to 250°C. for a period of 18 hours and a slight pressure increase was observed. The autoclave was vented. 104 grams of a black viscous product remained in the autoclave. The crude product was distilled to give 33 grams of a mixture of compounds.

EXAMPLE 14

Reaction with Benzyl Chloride

To a 250 ml. 3 neck pyrex flask fitted with a reflux condenser, thermometer and stirrer was charged 57 grams of benzyl chloride (0.45 mole) and 33.3 grams of $P_4S_{10}$(0.075 mole). The reaction mixture was kept under a nitrogen atmosphere and heated to a temperature of 160°-175°C. with stirring for 3 hours. All solid $P_4S_{10}$ had disappeared at this time. The reaction mixture was heated for 2 additional hours at a temperature of 165°C. The reaction product was recovered directly. Gas chromatograph analysis showed almost all the benzyl chloride had reacted. The crude product was distilled to yield 27.0 grams of a liquid having a boiling range of 115°-145°C. at 0.1 mm Hg. H-nmr analysis indicated that both the monobenzyldichloride product and the dibenzylmonochloride product were present. It was determined that the boiling point of the products was above their thermal stability point and it was not possible to readily isolate the products by distillation.

Chlorobenzene, vinyl chloride, allyl chloride, 2-chloro-2-methylpropane, neopentylchloride and dichloromethane were all reacted in a similar manner to that disclosed in the above examples. While in most instances the desired products were formed, complex reaction byproducts were also formed.

Effect of Adding $PSCl_3$

When $PSCl_3$ is added to the reaction mixture of alkyl chloride and phosphorus pentasulfide the normal reaction product $(RS)_2P(S)Cl$ is converted to $RSP(S)Cl_2$ as shown in the equation below:

$6RCl + 2\ PSCl_3 + P_4S_{10} \rightarrow 6RSP(S)Cl_2$

The conversion can also be effected after the initial reaction of the alkyl chloride and phosphorus pentasulfide by reacting $PSCl_3$ with the reaction mixture or the isolated monochloride product. The conversion occurs at temperatures as low as 100°C. but it is preferred to utilize temperatures above about 130° to about 300°C. The conversion of the monochloride product to the dichloride is represented by the equation set forth below:

$(RS)_2P(S)Cl + PSCl_3 \rightarrow 2RSP(S)Cl_2$

If the product desired is the dichloride, there is an obvious advantage to employing a one-step conversion instead of the two-step process. Since the reaction is an equilibrium system, it is desirable to add excess $PSCl_3$ to drive the reaction to the dichloride product.

EXAMPLE 15

Reaction with Methyl Chloride Employing $PSCl_3$

The 300 ml. stainless steel autoclave used in Example 1 was charged with 37.5 grams of methyl chloride (0.75 mole), 55.5 grams of $P_4S_{10}$ (0.125 mole) and 63.5 grams $PSCl_3$ (0.375 mole — 50 percent excess).

The reaction mixture was heated at a temperature of 200°C. for a period of 1 hour and at a temperature of 215°C. for an additional period of 12 hours.

The weight of liquid reaction product recovered from the autoclave was 145 grams (charged weight was 156.5 grams). Analysis by gas chromatograph showed the following compositions:

| Compound | Percentage |
| --- | --- |
| $PCl_3$ | 7.3 |
| $PSCl_3$ | 11.9 |
| $CH_3SP(S)Cl_2$ | 69.4 |
| $(CH_3S)_2P(S)Cl$ | 9.2 |
| $(CH_3S)_3PS$ | 0.2 |

The crude product was distilled to yield 101 grams of $CH_3SP(S)Cl_2$. This represents a 75 percent yield based on the methyl chloride charged. The weight of unreacted $PSCl_3$ was 17.2 grams.

EXAMPLE 16

Equilibrium Study

A 2.83 gram portion of $(CH_3S)_2P(S)Cl$ (0.155 mole) and 2.61 grams of $PSCl_3$ (0.155 mole) were sealed in a glass carius tube. The sample was heated to 130°C. for 233 hours after which no change occurred on further heating. Analysis of the product indicated it contained 0.50 grams of unreacted $(CH_{32})_2P(S)Cl$ and 4.65 grams of $CH_3SP(S)Cl_2$. Also remaining in the reaction mixture was about 0.4 grams of unreacted $PSCl_3$.

What is claimed is:

1. A process for the preparation of mono- and dialkyl-; mono- and dicyclohexyl-; and mono- and dibenzyl-mercapto phosphorothionochloridates which comprises heating a mixture of a chloride selected from the group consisting of lower alkyl chlorides containing from about 1 to about 8 carbon atoms inclusive, cyclohexyl chloride or benzyl chloride and phosphorus pentasulfide at an effective temperature in the range from about 160° to about 300°C., said effective temperature dependent upon the particular chloride employed, for a length of time sufficient to effect reaction.

2. The process of claim 1 wherein said chloride is methyl chloride.

3. The process of claim 1 wherein the temperature is from 200° to 300°C.

4. The process of claim 1 wherein said chloride is ethyl chloride.

5. The process of claim 1 wherein said chloride is 2-chloropropane.

6. The process of claim 1 wherein said chloride is 1-chloropropane.

7. The process of claim 1 wherein said chloride is benzyl chloride.

8. A process for preparing monoalkyl-; monocyclohexyl- or monobenzyl-mercapto phosphorothionochloridate which comprises heating a mixture of a chloride selected from the group consisting of alkyl chlorides containing from about 1 to about 8 carbon atoms inclusive, cyclohexyl chloride or benzyl chloride; phosphorus pentasulfide and thiophosphoryl chloride at an effective temperature in the range of from about 160° to about 300°C. said effective temperature dependent upon the particular chloride employed for a length of time sufficient to effect reaction.

9. The process of claim 8 wherein said chloride employed is methyl chloride.

10. The process of claim 8 wherein the temperature is from about 200° to about 300°C.

11. The process of claim 8 wherein said chloride is ethyl chloride.

12. The process of claim 8 wherein said chloride is 2-chloropropane.

13. The process of claim 8 wherein said chloride is 1-chloropropane.

14. The process of claim 8 wherein said chloride is benzyl chloride.

15. A process for preparing monoalkyl-; monocyclohexyl- or monobenzyl- mercapto phosphorothionodichloridate wherein a mixture containing monoalkyl-, the alkyl group containing from about 1 to about 8 carbon atoms inclusive; monocyclohexyl- or monobenzyl- phosphorothionodichloridate and dialkyl-, each alkyl group containing from about 1 to about 8 carbon atoms inclusive; dicyclohexyl- or dibenzyl- phosphorothionochloridate is reacted with thiophosphoryl chloride at a temperature between about 100° and about 300°C. for a sufficient length of time to form monoalkyl-; monocyclohexyl- or monobenzyl- mercapto phosphorothionodichloridate.

16. The process of claim 15 wherein the alkylmercapto group is methylmercapto.

17. The process of claim 15 wherein the temperature is from about 130° to about 300°C.

18. The process of claim 15 wherein the alkyl mercapto group is ethyl mercapto.

19. The process of claim 15 wherein the alkyl mercapto group is 2-propylmercapto.

20. The process of claim 15 wherein the alkyl mercapto group is 1-propylmercapto.

21. The process of claim 15 wherein the mercapto group is benzyl mercapto.

22. A process for preparing monoalkyl-; monocyclohexyl- or monobenzyl- mercapto phosphorothionodichloridate which comprises heating a mixture containing dialkyl-, the alkyl group containing from about 1 to about 8 carbon atoms inclusive; dicyclohexyl- or dibenzyl- phosphorothionochloridate and thiophosphoryl chloride at a temperature between about 100° and about 300°C. for a sufficient length of time to form monoalkyl-; monocyclohexyl- or monobenzyl- mercapto phosphorothionodichloridate.

23. The process of claim 22 wherein the alkyl mercapto group is methyl mercapto.

24. The process of claim 22 wherein the temperature is from about 130° to about 300°C.

25. The process of claim 22 wherein the alkyl mercapto group is ethyl mercapto.

26. The process of claim 22 wherein the alkyl mercapto group is 2-propylmercapto.

27. The process of claim 22 wherein the alkyl mercapto group is 1-propylmercapto.

28. The process of claim 22 wherein the mercapto group is benzyl mercapto.

* * * * *